(12) United States Patent
Nord et al.

(10) Patent No.: US 11,463,951 B2
(45) Date of Patent: Oct. 4, 2022

(54) USER EQUIPMENT, COMMUNICATION SYSTEM, AND METHOD OF CONTROLLING A USER EQUIPMENT

(71) Applicant: Sony Mobile Communications Inc., Tokyo (JP)

(72) Inventors: Lars Nord, Lund (SE); Peter C. Karlsson, Lund (SE); Rickard Ljung, Helsingborg (SE); Basuki Priyanto, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 15/768,937

(22) PCT Filed: Nov. 6, 2015

(86) PCT No.: PCT/EP2015/075883
§ 371 (c)(1),
(2) Date: Apr. 17, 2018

(87) PCT Pub. No.: WO2017/076458
PCT Pub. Date: May 11, 2017

(65) Prior Publication Data
US 2019/0059052 A1    Feb. 21, 2019

(51) Int. Cl.
*H04W 52/02* (2009.01)
*H04W 28/02* (2009.01)
(Continued)

(52) U.S. Cl.
CPC ... *H04W 52/0212* (2013.01); *H04W 28/0221* (2013.01); *H04W 36/12* (2013.01);
(Continued)

(58) Field of Classification Search
CPC ............ H04W 52/0212; H04W 36/14; H04W 28/0221; H04W 52/0258; H04W 4/70;
(Continued)

(56) References Cited

U.S. PATENT DOCUMENTS

2015/0016323 A1    1/2015   Kumar
2015/0189587 A1    7/2015   Bennett
(Continued)

FOREIGN PATENT DOCUMENTS

GB    2513896    * 11/2014    ............ H04W 72/04
GB    2513896 A    11/2014

OTHER PUBLICATIONS

3GPP TR 23.720 v. 1.1.0 (Oct. 2015).*
(Continued)

*Primary Examiner* — Jae Y Lee
(74) *Attorney, Agent, or Firm* — Tucker Ellis LLP

(57) ABSTRACT

A user equipment (10) is operable in a first mode in which the user equipment (10) is configured for communication with a first cellular network (30) and a second mode in which the user equipment (10) is configured for communication with a second cellular network (40). Mode switching between the modes is performed autonomously by the user equipment (10) or under the control of a cellular network node. The user equipment (10) has a first power consumption when operating in the first mode and a second power consumption when operating in the second mode, the second power consumption being different from the first power consumption.

19 Claims, 13 Drawing Sheets

(51) Int. Cl.
  *H04W 36/14* (2009.01)
  *H04W 36/12* (2009.01)
  *H04W 4/70* (2018.01)
  *H04W 88/06* (2009.01)
(52) U.S. Cl.
  CPC ....... *H04W 36/14* (2013.01); *H04W 52/0258* (2013.01); *H04W 4/70* (2018.02); *H04W 88/06* (2013.01); *Y02D 30/70* (2020.08)
(58) Field of Classification Search
  CPC ....... H04W 88/06; Y02D 70/26; Y02D 70/21; Y02D 70/1262; Y02D 70/00
  See application file for complete search history.

(56) References Cited

U.S. PATENT DOCUMENTS

| | | | | |
|---|---|---|---|---|
| 2017/0127263 | A1* | 5/2017 | Chen | H04L 41/0803 |
| 2018/0146418 | A1* | 5/2018 | Sharma | H04W 48/16 |
| 2018/0249318 | A1* | 8/2018 | Ian | H04W 60/00 |
| 2018/0295603 | A1* | 10/2018 | Saily | H04W 76/10 |

OTHER PUBLICATIONS

"3rd Generation Partnership Project; Tecnnical Specification Group Services and System Aspects; Architecture enhancements for Cellular Internet of Things (Release 13)", 3GPP Standard; 3GPP TR 23.720, 3rd Generation Partnership Project (3GPP), Mobile Competence Centre ; 650, Route Des Lucioles; F-06921 Sophia-Antipolis Cedex; France, vol. SA WG2, No. V1.1.0, Oct. 29, 2015, pp. 1-90. XP051046169.

"3rd Generation Partnership Project; Technical Specification Group Radio Access Network; Study on provision of low-cost Machine-Type Communications (MTC) User Equipments (UEs) based on LTE (Release 12)"; 3GPP TR 36.888; 3rd Generation Partnership Project (3GPP), 650, Route Des Lucioles—Sophia-Antipolis, Valbonne, France; No. V12.0.0, Jun. 26, 2013, pp. 1-55.

"3rd Generation Partnership Project; Technical Specification Group GSM/EDGE Radio Access Network; Cellular system support for ultra-low complexity and low throughput Internet of Things (CIoT) (Release 13)"; 3GPP TR 45.820; 3rd Generation Partnership Project (3GPP), 650, Route Des Lucioles—Sophia-Antipolis, Valbonne, France; No. V13.0.0, Sep. 22, 2015, pp. 1-495.

"3rd Generation Partnership Project; Technical Specification Group Services and System Aspects; Architecture enhancements for Cellular Internet of Things (Release 13)"; 3GPP TR 23.720; 3rd Generation Partnership Project (3GPP), 650 Route Des Lucioles—Sophia-Antipolis, Valbonne, France; No. V1.0.0, Sep. 24, 2015, pp. 1-74.

International Search Report and Written Opinion; dated Jun. 29, 2016; issued in International Patent Application No. PCT/EP2015/075883.

* cited by examiner

USER EQUIPMENT, COMMUNICATION SYSTEM, AND METHOD OF CONTROLLING A USER EQUIPMENT

FIELD OF THE INVENTION

Embodiments of the invention relate to wireless communication. Embodiments of the invention relate in particular to a user equipment operative to communicate with at plural cellular networks.

BACKGROUND OF THE INVENTION

With increasing popularity of mobile data communication, an ever increasing number of devices is equipped with a radio interface for communication with a cellular communication network. Sensors and wearable devices are examples for devices that may be operative for communication with a cellular network.

While some kinds of user equipments are expected to provide high data rates, such as smartphones or portable computers, battery lifetime is of significant importance for other types of user equipments that may not require high data rates. Sensors, wearable devices, or other units that infrequently transmit small amounts of data are examples of devices for which long battery lifetime is particularly relevant. Further, in view of the ever increasing number of user equipments that is deployed for communication with a cellular network radio resource usage is a relevant issue. In particular, techniques that may assist reducing radio access network loads become increasingly popular.

User equipments may be operative to support multiple radio access techniques (RAT). Criteria for switching between those radio access techniques may be based on network availability and network preference. Switching between such legacy cellular RATs do normally not assist the user equipment in prolonging battery lifetime and to normally not reduce the loads on the radio access networks. Switching between multiple different RATs such as GSM, WCDMA, or LTE radio access techniques is typically a complex process that may add significantly to power consumption and to radio access network loads. Such transitions are triggered by network availability and are not associated with differences in power consumption levels.

It would be desirable to provide techniques that allow a user equipment battery life-time to be prolonged and/or that reduce the loads on the radio access network.

BRIEF SUMMARY OF THE INVENTION

There is a continued need in the art for devices, systems and methods which mitigate at least some of the above shortcomings. There is a need for devices, systems and methods that allow user equipment battery lifetime to be extended and/or that allow radio access network loads to be reduced.

According to embodiments, a user equipment may have at least two different modes for communication with at least two different cellular networks. The at least two different cellular networks may have different radio access networks and/or different core networks. The at least two different cellular networks may comprise a first network that is a Machine Type Communications (MTC) cellular network. The at least two different cellular networks may comprise a second network that is a Cellular Internet of Things (CIoT) cellular network having a narrow band Internet of Things (NB-IoT) radio access network.

By dynamically switching between the first cellular network and the second cellular network the user equipment power consumption and/or usage of radio access network resources may be reduced.

The switching between the first cellular network and the second cellular network may be performed autonomously by the user equipment. Alternatively or additionally, an eNodeB or other base station may be operative to control a mode switching performed by the user equipment. The base station may be connected to a first core network of the first cellular network and to a second core network of the second cellular network.

Various criteria may be employed to determine whether the first mode or the second mode is to be used. The dynamic mode switching may be performed in dependence on an amount of user data that is to be transmitted uplink or downlink, in dependence on an interval at which data is to be transmitted uplink or downlink, in dependence on a mobility of the user equipment, and/or in dependence on other information.

The dynamic mode switching may be performed such that one of the first mode and the second mode is used for uplink user data transmissions and that the other one of the first mode and the second mode is used for downlink user data transmissions. Other criteria may additionally or alternatively be taken into account. For illustration, a required coverage may be one criterion upon which a determination may be based on whether the user equipment is to perform a mode switching from the first mode to the second mode or vice versa.

A user equipment according to an embodiment comprises a radio interface and a processing device coupled to the radio interface to control the radio interface. The processing device is operative to control a mode switching between a first mode in which the user equipment is configured for communication with a first cellular network and a second mode in which the user equipment is configured for communication with a second cellular network. The mode switching may be a dynamic mode switching in which the operation mode of the user equipment is repeatedly changed from the second mode to the first mode and back to the second mode.

The user equipment may have a first power consumption when operating in the first mode and a second power consumption when operating in the second mode, the second power consumption being different from the first power consumption. Thus, by performing the mode switching between the first mode and the second mode power consumption and optionally also radio access network loads may be reduced. By using the second mode when small amounts of data have to be transmitted infrequently, the time-averaged power consumption may be reduced.

Alternatively or additionally, attach procedures by which the user equipment attaches to the first cellular network and to the second cellular network may have different complexities. For illustration, the total number of messages that needs to be transmitted and received by the user equipment before the user equipment has completed the attach procedure such that it can start transmitting or receiving user data may be different for the first mode and for the second mode.

The user equipment may be configured for communication with a Cellular Internet of Things, CIoT, network when operating in the second mode. I.e., the second cellular network may be a CIoT network.

The first cellular network may have a first core network and the second cellular network may have a second core network different from the first core network.

The user equipment may be operative to communicate with the first core network via a first radio access network. The first radio access network may be an evolved Machine-Type-Communication (eMTC) radio access network.

The user equipment may be operative to communicate with the second core network via a second radio access network and, optionally, via the first radio access network. The second radio access network may be a NarrowBand Internet of Things (NB-IoT) network. The first radio access network may be the eMTC radio access network.

The user equipment may be configured such that, when the user equipment operates in the first mode, the user equipment must transmit and receive a first number of messages before user data can be sent to the first cellular network or can be received from the first cellular network. The user equipment may be configured such that, when the user equipment operates in the second mode, the user equipment must transmit and receive a second number of messages before user data can be sent to the second cellular network or can be received from the second cellular network. The second number of messages may be less than the first number of messages. Thereby, reduced power consumption is attained when the user equipment performs a mode switching so as to operate in the second mode. Further, radio access network loads are reduced when the user equipment performs a mode switching such that it operates in the second mode.

The user equipment may be operative to transmit and/or receive user data in a control plane signalling message when operating in the second mode.

The user equipment may be operative to transmit and/or receive user data in a non-access stratum (NAS) Protocol Data Unit (PDU) when operating in the second mode.

The user equipment may be configured such that it cannot transmit and/or receive user data in a control plane signalling message when operating in the first mode. The user equipment may be operative to transmit and/or receive user data in a user plane signalling message when operating in the first mode. The user equipment may be operative to transmit and/or receive user data only in user plane signalling messages when operating in the first mode.

The user equipment may be configured such that it cannot transmit and/or receive user data in a non-access stratum (NAS) Protocol Data Unit (PDU) when operating in the first mode.

The user equipment may be operative to perform the mode switching in dependence on an amount of user data that is to be transmitted or received, and/or a time interval between successive user data transmissions. The mode switching may respectively be performed autonomously by the user equipment or under the control of a base station.

The user equipment may be operative to switch to the second mode if the amount of user data is less than a data amount threshold and if the time interval exceeds a time interval threshold. Thereby, the second mode having lower power consumption and lower signalling complexity may be used for infrequent data transmissions of small amounts of user data. Such data transmissions frequently occur for sensors or wearable devices.

The user equipment may be operative to transmit a buffer status report, BSR, to indicate an amount of user data that is to be transmitted uplink. The base station may determine based on the BSR whether the uplink data transmission is performed in the first mode or in the second mode.

The base station may be configured to determine based on the BSR or another buffer level indicator received from the user equipment whether the first cellular network or the second cellular network is to grant the user equipment uplink (UL) resources.

The base station may be configured to determine that, if the amount of data announced using BSR or other buffer level indicators is below a buffer level threshold the second cellular network will grant the user equipment UL resources.

The base station may be configured to determine that, if the amount of data announced using BSR or other indicators exceeds a buffer level threshold the first cellular network will grant the user equipment UL resources.

The processing device may be operative to control the user equipment to effect the mode switching from the second mode to the first mode in response to a paging signal from the second cellular network. This allows the user equipment to stay in the second mode having lower power consumption while being idle and to be woken up to the first mode from the second mode.

The processing device may be operative to control the user equipment to attach to the first cellular network in response to the paging signal received from the second cellular network. This allows the user equipment to stay in the second mode having lower power consumption while being idle and to be woken up to the first mode from the second mode.

The paging signal may include an indicator for an amount of user data that is to be transmitted in a downlink transmission. The indicator may provide implicit or explicit information on the amount of user data that is to be transmitted downlink. If the amount of data exceeds a data amount threshold, then the user equipment may perform the random access in the first network, else the user equipment may perform the random access in the second network.

The processing device may be operative to control the user equipment to effect the mode switching between the first mode and the second mode in response to a trigger event. The trigger event may be configurable by a base station.

The processing device may be operative to cause storage of operating parameters of a mode in which the user equipment operated prior to a first mode switching and to reuse the operating parameters when the user equipment returns to the mode in a subsequent second mode switching. Processing loads at the user equipment and radio access network loads may thereby be further reduced.

The processing device may be operative to process system information transmitted by a base station to determine whether the operating parameters are to be reused. The system information may be transmitted by the base station and may include a system information indicator indicating whether the previously used parameters for the first mode or the second mode may be reused when the user equipment returns to the mode.

The processing device may alternatively or additionally be operative to determine autonomously whether the previously used operating parameters for the first mode or the second mode may be reused when the user equipment returns to the mode. To this end, the processing device may evaluate a few basic characteristics of carrier frequencies and may determine based on these characteristics whether the previously used parameters may be reused when the user equipment returns to a mode.

The user equipment may be configured such that the mode switching may be performed as a function of a mobility of the user equipment. Operation in the second mode may be selectively prohibited if the user equipment has a mobility that causes the user equipment to move between cells of the second cellular network. The mobility may be evaluated by the user equipment or the base station. The switching to the second mode may be prohibited autonomously at the user equipment or based on base station control if the user equipment has a mobility that causes the user equipment to move between cells of the second cellular network.

Subframes of the first radio access network and subframes of the second radio access network may be aligned in the time domain. The subframes of the first radio access network and the subframes of the second radio access network may have the same subframe duration and may start and end at the same times.

System information transmission in the first radio access network and the second radio access network may be synchronised.

Such configurations help minimise the synchronisation afford for the dynamic switching operation of the user equipment.

The frequency resources of the second radio access network of the second cellular network may have a second bandwidth which is less than a first bandwidth of frequency resources of the first radio access network. For illustration, the second radio access network may be a NB-IoT RAN having a bandwidth of 200 kHz. The first radio access network may be an eMTC RAN having a bandwidth of 1.4 MHz, for example.

The frequency resources of the second radio access network may be arranged in an in-band configuration, in the LTE guard band or outside the LTE band.

The second radio access network may be configured such that it has a lower data rate than the first radio access network.

According to another embodiment, a base station is provided. The base station may be an eNodeB. The base station may be connected to a first core network and a second core network to allow the user equipment to communicate with a first cellular network and a second cellular network.

The base station may be operative to control a mode switching of the user equipment between a first mode in which the user equipment is operative for communication with the first cellular network and a second mode in which the user equipment is operative for communication with the second cellular network.

The base station may be operative to transmit or receive user data in a NAS PDU when the user equipment operates in the second mode.

The base station may be operative to maintain a database of user equipment capability information which indicates whether user equipment located in a cell served by the base station is operative to dynamically switch from the first mode to the second mode having lower power consumption and to dynamically switch back from the second mode to the first mode.

The base station may be operative to determine based on an amount of user data that is to be transmitted downlink or uplink and/or based on an interval between user data transmissions whether the user equipment is to operate in the first mode or the second mode.

The base station may be operative to determine that the user equipment shall use the second mode if the amount of user data that is transmitted per transmission is less than a data amount threshold and if the interval between user data transmissions is longer than an interval threshold.

The base station may be operative to prevent the user equipment from switching to the second mode as a function of a mobility of the user equipment. The base station may be operative to prevent the user equipment from switching to the second mode if the base station determines that the user equipment moves between cells of the second cellular network with at least a predefined rate.

The base station may be operative to determine whether a user equipment that operates in the second mode after a mode switching may reuse parameters of the first mode in which the user equipment operated before switching to the second mode when the user equipment subsequently returns into the first mode.

The base station may be operative to transmit or broadcast system information which includes a system information indicator indicative of whether the user equipment can reuse parameters of a previously activated mode when it returns to that mode later.

The system information indicator may be a flag included in a system information block, SIB, or in other system information.

The base station may be operative to transmit a paging signal in a second radio access network, e.g. NB-IoT, to cause the user equipment to attach to the first cellular network. The base station may be operative to determine based on an amount of user data, a frequency of data transmissions, user equipment mobility, and/or payload data context whether the user equipment shall switch between the first cellular network or the second cellular network.

The base station may be operative such that subframes of the first radio access network and subframes of the second radio access network are aligned in the time domain. The base station may be operative such that subframes of the first radio access network and the subframes of the second radio access network may have the same subframe duration and may start and end at the same times.

The base station may be operative such that system information transmission in the first radio access network and the second radio access network may be synchronised.

Such configurations help minimise the synchronisation afford for the dynamic switching operation of the user equipment.

The base station may provide radio access in accordance with eMTC RAN specification and in accordance with NB-IoT specification.

According to another embodiment, a core network node is provided. The core network node may be a Mobility Management Entity (MME). The core network node may be configured to store user equipment context information when the user equipment is connected to the respective cellular network. The core network node may have an interface to share the user context information with a further core network node of a further, different core network.

The core network node may be an MME of a CIoT CN. The MME of the CIoT CN may be configured to share user equipment context information with an MME of a legacy Long Term Evolution (LTE) CN after the user equipment has registered with the MME of the CIoT. This MME of the legacy CN and the legacy LTE CN may support the eMTC devices. Thereby, information on the registration of the user equipment may be shared between core network nodes without requiring the user equipment to register with two MMEs. Battery lifetime of the user equipment and radio access network nodes are further improved.

The core network node may be an MME of a legacy LTE CN. This MME of the legacy CN and the legacy LTE CN may support the eMTC devices. The MME of the legacy LTE CN may be configured to share user equipment context information with an MME of a CIoT CN after the user equipment has registered with the MME of the legacy LTE CN. Thereby, information on the registration of the user equipment may be shared between core network nodes without requiring the user equipment to register with two MMEs. Battery lifetime of the user equipment and radio access network nodes are further improved.

According to another embodiment, a method of controlling operation of a user equipment is provided. The user equipment comprises a radio interface and is operative to attach to a first cellular network and to attach to a second cellular network different from the first cellular network. The method comprises controlling the user equipment such that it operates in a first mode in which the user equipment is operative to attach to the first cellular network, the user equipment having a first power consumption when operating in the first mode. The method comprises controlling a mode switching between the first mode and a second mode in which the user equipment is operative to attach to the second cellular network. The method comprises controlling the user equipment such that it operates in a second mode in which the user equipment is operative to attach to the second cellular network. The user equipment may have a second power consumption when operating in the second mode, the second power consumption being different from the first power consumption.

Additional features of the method according to an embodiment may correspond to the additional features explained in the context of user equipments, base stations, and communication systems according to embodiments.

The method may be performed by the user equipment according to an embodiment.

Various control operations, such as controlling the mode switching, may also be performed under the control of a base station or with the aid of a base station.

A communication system according to an embodiment comprises a base station coupled to a first core network and to a second core network and the user equipment according to an embodiment.

The first core network may be a legacy LTE CN. The second core network may be a CIoT CN.

The first core network may comprise a first core network node and the second core network may comprise a second core network node interfaced with the first core network node. The first core network node may be operative to transfer to the second core network node user equipment context information stored in the first core network node. The second core network node may be operative to transfer to the first core network node user equipment context information stored in the second core network node.

The base station may be a base station according to an embodiment.

Devices, systems and methods according to embodiments allow a communication device to dynamically switch between different communication systems, which respectively are associated with different signalling complexity and accordingly different user equipment power consumption. The dynamic switching may be performed depending on the amount of user data that is to be transmitted, transmission intervals, mobility of the user equipment, or other parameters that may change dynamically, triggering the user equipment to autonomously change between different modes or causing the base station to control a mode switching of the user equipment.

While embodiments have been described in the context of CIoT and legacy LTE cellular networks above, the techniques disclosed herein may also be employed for other first and second cellular networks that provide different complexity of signalling.

BRIEF DESCRIPTION OF THE DRAWINGS

Embodiments of the invention will be described with reference to the accompanying drawings in which the same or similar reference numerals designate the same or similar elements.

DESCRIPTION OF EMBODIMENTS

Exemplary embodiments of the invention will be described with reference to the drawings. While some embodiments will be described in the context of specific fields of application, e.g. in the context of certain spectral ranges and communication techniques, the embodiments are not limited to this field of application. The features of the various embodiments may be combined with each other unless specifically stated otherwise.

Figure 1:
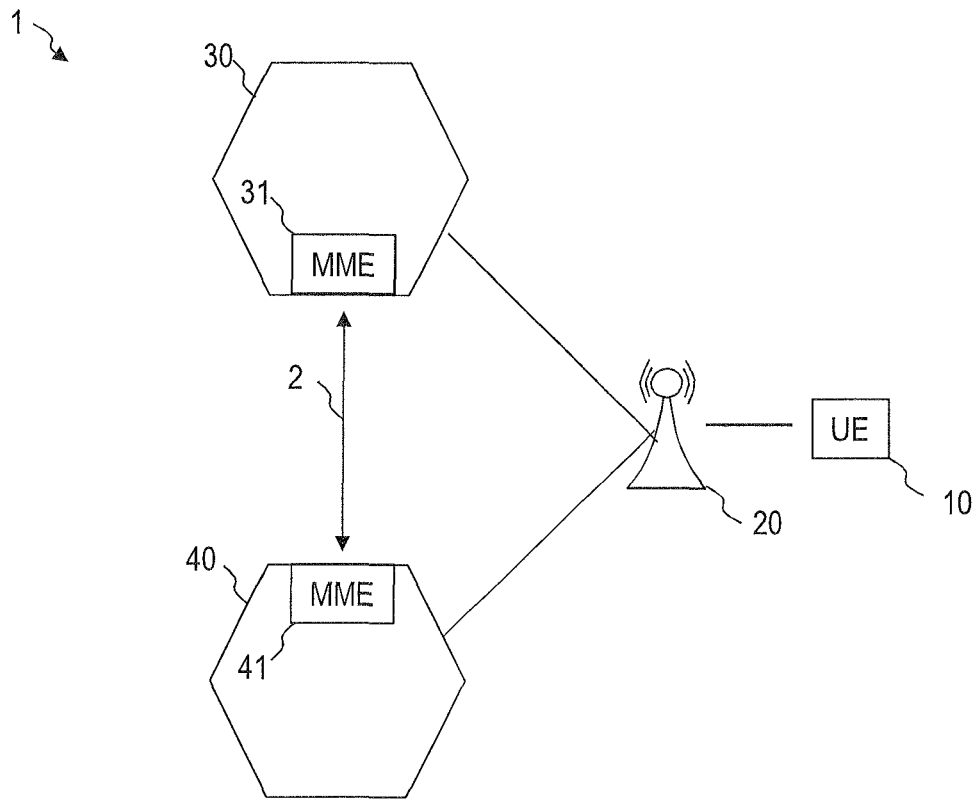
FIG. 1 is a schematic view of a communication system according to an embodiment.

FIG. 1 is a schematic view of a communication system 1 according to an embodiment.

The communication system 1 comprises a first cellular network and a second cellular network. The first cellular network has a first core network 30. The second cellular network has a second core network 40 which may be different from the first core network 30. A base station 20 which may be an eNodeB may be connected to both the first core network 30 and the second core network 40.

The first cellular network may have an evolved Machine Type Communication (eMTC) radio access network (RAN). The first cellular network may have an MTC RAN as described in 3GPP TR 36.888 V12.0.0 (Rel-12) and eMTC for Rel-13. The first core network (CN) may be a legacy LTE CN or another network.

The second cellular network may be a Cellular Internet of Things (CIoT) network. The second cellular network may have a NB-IoT RAN. The second cellular network may have a CIoT CN. The second cellular network may be a CIoT network as described in 3GPP TR 45.820 and 3GPP TR 23.720. The second cellular network may be a CIoT network as described in 3GPP TR 45.820 V13.0.0 (Rel-13) and 3GPP TR 23.720 V1.0.0 (Rel-13).

The base station 20 may be connected to both core networks 30, 40. While a base station 20 connected to both core networks is shown in FIG. 1, the base station 20 may comprise two separate logical units that serve as a base station of the first radio access network and the base station for the second radio access network, respectively. In still further embodiments, the base station of the first radio access network and the base station for the second radio access network may be separate physically units.

A user equipment 10 is configured for communication with the first cellular network and the second cellular network. The first and second cellular networks provide different cellular systems and use different procedures for user data transmission. For illustration, the first cellular network may not support control plane user data transmission in which user data is transmitted in a Non-Access Stratum (NAS) Protocol Data Unit (PDU), whereas the second cellular network may support a control plane user data transmission in which user data is transmitted in a NAS PDU.

As will be described in more detail below, the user equipment 10 is configured to dynamically switch between a first mode in which it is operative for communication with the first cellular network and a second mode in which it is operative for communication with the second cellular network. The switching may be performed in dependence on dynamically varying parameters, such as an amount of user data that is to be transmitted uplink or downlink, transmission interval between successive transmissions, a mobility of the user equipment, data context, or other parameters.

The switching may be performed autonomously by the user equipment 10, without requiring the base station 20 to have knowledge of the switching. A trigger event monitored by the user equipment 10 which triggers the mode switching from the first mode to the second mode or from the second mode to the first mode may be set by the base station 20. The user equipment 10 may alternatively or additionally be configured for a mode switching which is performed under the control of the base station 20. The base station 20 can in this case dynamically allocate a user equipment 10 to the first and second modes that are supported by the user equipment 10.

Various criteria may be used in the switching mechanism. For illustration, a data payload size and a transmission interval may be evaluated to determine with a mode switching can be performed. The second mode in which the user equipment has lower power consumption and in which procedures between the user equipment 10 and the second cellular network (e.g. CIoT) are less complex than in the first mode in which the user equipment 10 communicates with the first cellular network (e.g. eMTC) may be selectively used when the user equipment 10 infrequently transmits small amounts of user data uplink or infrequently receives small amounts of user data downlink. Uplink and downlink user data transmission may be performed in different ones of the first and second modes. For illustration, uplink user data transmissions may be performed using the second mode when such uplink user data transmissions each have small amounts of data and occur infrequently. The first mode providing higher data rates may be used for downlink data transmissions.

Alternatively or additionally, mobility of the user equipment 10 may be taken into account in the mode switching. When the user equipment 10 moves frequently from one cell to another cell, a mode switching from the first mode to the second mode may be suppressed or may at least be made less likely. In this case, when the user equipment 10 moves frequently between cells the mode switching may be implemented in such a way that the first mode remains the preferred mode.

Alternatively or additionally, a buffer status report indicating a user equipment buffer level may be taken into account to determine whether a mode switching from the first mode to the second mode or from the second mode to the first mode is to be performed. For a buffer status report indicating a buffer level that exceeds a buffer level threshold, the first mode may be preferred because it can support higher data rates. The base station 20 may determine that the first cellular network will grant UL resources to the user equipment 10 when the buffer level exceeds the buffer level threshold and that the second cellular network will grant UL resources to the user equipment 10 otherwise.

Alternatively or additionally, the context of the data to be transmitted may be taken into account to determine whether a mode switching is to be performed.

Various effects are attained by the methods, devices, and systems according to embodiments. For illustration, the base station 20 is provided with flexibility in managing resources between the first radio access network and the second radio access network. Resource allocation may be performed in different ways. The NB-IoT frequency resources may be selected such that they are located within an MTC band (NB-IoT inband), within an LTE guardband (NB-IoT guardband) or outside of the LTE band (NB-IoT stand-alone). The base station 20 has the capability to locate the user equipment 10 in the network based on its data traffic. A higher data rate is attainable when the user equipment 10 performs a mode switching such that it operates in the first mode. Lower power consumption and reduced radio access network loads are attainable when the user equipment 10 is switched to the second mode. Further, the base station 20 may optimise half duplex and asymmetric transmissions. The base station 20 may perform a resource allocation such that the downlink uses the first radio access network and the uplink uses the second radio access network, or vice versa.

The techniques described herein provide the user equipment with scalability of its device operation and optimise the battery usage by selecting the operation mode from among the first mode or the second mode depending on the data traffic. The radio access network that is used for communication may be dynamically changed depending on the amount of data traffic. The higher complexity procedures of the first radio access network may be used, at the expense of increased power consumption and increased signalling loads, when data rates are high. The lower complexity procedures of the second radio access network may be used, at the expense of having lower data rates, when power consumption is to be reduced. Coverage extensions may be attained when the user equipment switches to the second mode, because NB-IoT may provide an additional coverage extension compared to eMTC.

While a user equipment 10 capable of performing the mode switching that will be described in more detail below is shown in FIG. 1, it will be appreciated that the system 1 may comprise more than one user equipment 10 capable of performing such a mode switching or that the system 1 may additionally also include other user equipments which to not need to support a mode switching between the first mode in which the user equipment attaches to the first cellular network and the second mode in which the user equipment attaches to the second cellular network.

Devices, methods, and systems according to embodiments will be described in more detail with reference to FIG. 2 to FIG. 21.

Figure 2:
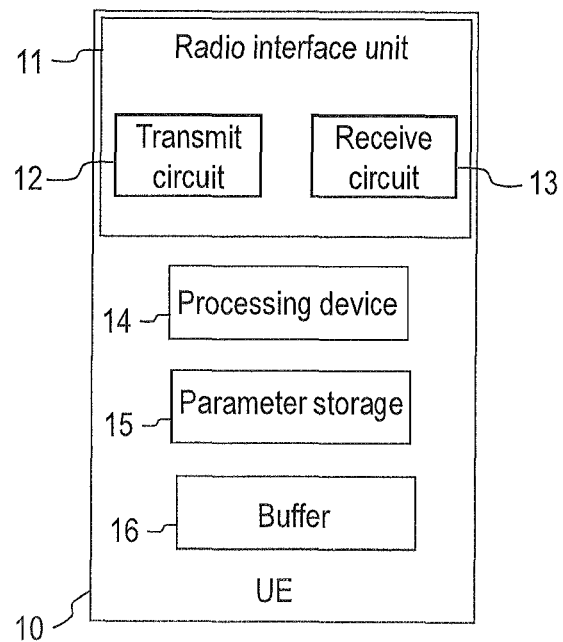
FIG. 2 is a block diagram of a user equipment according to an embodiment.

FIG. 2 is a block diagram of a user equipment 10 according to an embodiment. The user equipment 10 may be a sensor or a wearable device.

The user equipment 10 has a radio interface unit 11 which may include a transmit circuit 12 and a receive circuit 13. The radio interface unit 11 may be configured to transmit and receive signals to and from a first core network of the first cellular network via a first radio access network. The radio interface unit 11 may be configured to transmit and receive signals to and from a second core network of the second cellular network via a second radio access network and, optionally, also via the first radio access network. Operation of the radio interface unit 11 may be adjustable under the control of a processing device 14 to dynamically change operation of the user equipment 10 between a first mode for communication with the first cellular network and a second mode for communication with the second cellular network.

It will be appreciated that, as used herein, any reference to a switching "between a first mode and a second mode" is not intended to imply any particular direction of the mode change. I.e., the term switching "between a first mode and a second mode" covers both a switching from the first mode to the second mode and a switching from the second mode to the first mode.

The processing device 14 may be configured to control operation of at least the radio interface unit 11. The processing device 14 may include one or several processors, controllers, application specific integrated circuits (ASICs), other integrated circuits or combinations of such devices. The processing device 14 may be configured to monitor a trigger event for to anonymous mode switching between the first mode and the second mode. Alternatively or additionally, the processing device 14 may be configured to control the radio interface unit 11 in dependence on control signalling from the base station 20 which causes the user equipment 10 to perform the mode switching between the first mode and the second mode.

The processing device 14 may be configured to control one or several operating parameters of the radio interface unit 11 depending on the mode to which the user equipment 10 has been switched. For illustration, in order to effect a radio access via the NB-IoT RAN, the processing device 14 may control the radio interface unit 11 such that signals are transmitted only in the narrower band of the NB-IoT, which may have a bandwidth of 200 kHz, for example.

The user equipment 10 may comprise a storage medium 15 for non-volatile parameter storage. The parameters stored in the storage medium 15 may be parameters associated with the first mode and/or the second mode. The storage medium 15 may be a solid state storage medium. The processing device 14 may be operative to determine whether, after the user equipment has switched from the first mode to the second mode, the user equipment may reuse parameters stored in the storage medium 15 if the user equipment 10 returns to the first mode in a further mode switching. The processing device 14 may be operative to determine whether, after the user equipment has switched from the second mode to the first mode, the user equipment may reuse parameters stored in the storage medium 15 if the user equipment 10 returns to the second mode in a further mode switching. The determination method parameters may be reused may be implemented in various ways. For illustration, the base station 20 may transmit or broadcast system information which includes a system information indicator indicative of the whether the parameters of a previously used mode may be reused by the user equipment 10. The user equipment 10 may in this case evaluate the system information indicator to determine whether the previously used parameters in the storage medium 15 may be reused or are to be discarded. Alternatively or additionally, the user equipment 10 may compare a subset of basic radio access network parameters to the parameters stored in the storage medium 15. If agreement is found, the parameters stored in the storage medium 15 are reused. Otherwise, the parameters stored in the storage medium 15 may be discarded and new parameters may be retrieved from the base station 20.

The user equipment 10 may comprise a buffer 16. The buffer 16 may be operative to store user data for uplink transmission. The processing device 14 may be operative to generate a buffer status report for transmission via the radio interface unit 11. Depending on the buffer filling level, the user equipment 10 may perform a mode switching such that higher data amounts may be transmitted when the user equipment 10 operates in the first mode while smaller data amounts may be transmitted when the user equipment 10 operates in the second mode.

The first mode and the second mode may have various implementations. Generally, the first mode may allow the user equipment to communicate with a first cellular network using more complex signalling before data transmission can be started and requiring higher power consumption until data transmission can be started. The first mode may provide higher data rates than the second mode. The second mode, on the other hand, may allow the user equipment to communicate with the second cellular network using less complex signalling before data transmission can be started and requiring a lower power consumption until data transmission can be started when compared to the first mode.

Figure 3:
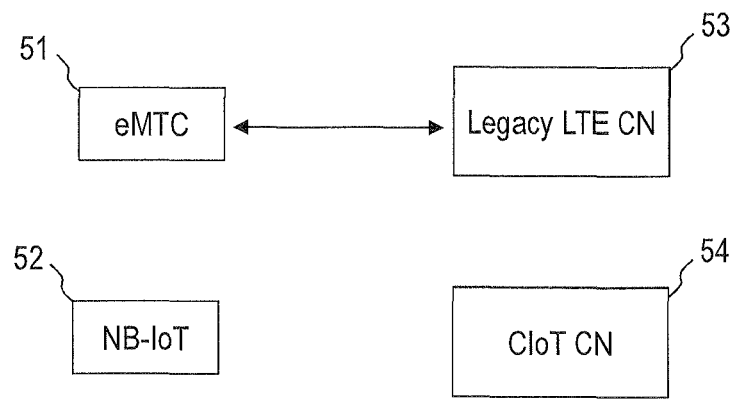
FIG. 3 illustrates a first mode of a user equipment according to an embodiment.
Figure 4:
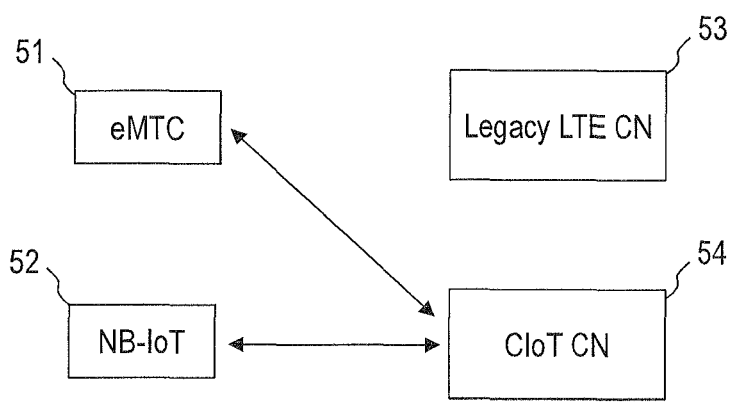
FIG. 4 illustrates a second mode of a user equipment according to an embodiment.

With reference to FIG. 3 and FIG. 4, exemplary first and second modes will be explained in more detail.

FIG. 3 illustrates how a user equipment 10 communicates with a first cellular network when operating in the first mode. When operating in the first mode, the user equipment 10 may be configured to establish communication with a first core network which may be a legacy LTE core network 53 via a first radio access network which may be an eMTC RAN 51. When operating in the first mode, the user equipment 10 may not be enabled to establish communication with a second core network which may be a CIoT CN 54.

FIG. 4 illustrates how a user equipment 10 communicates with a second cellular network when operating in the second mode. When operating in the second mode, the user equipment 10 may be configured to establish communication with a second core network which may be a CIoT CN 54 via a second radio access network which may be a NB-IoT RAN 52. When operating in the second mode, the user equipment 10 may optionally be operative to establish communication with the second core network via the first radio access network, which may be the eMTC RAN 51. When operating in the second mode, the user equipment 10 may not be enabled to establish communication with the first core network which may be the legacy LTE CN 53.

The resources of the second radio access network may have various configurations. Generally, the frequencies available to the second radio access network may have a smaller bandwidth and the frequencies available to the first radio access network.

Figure 5:
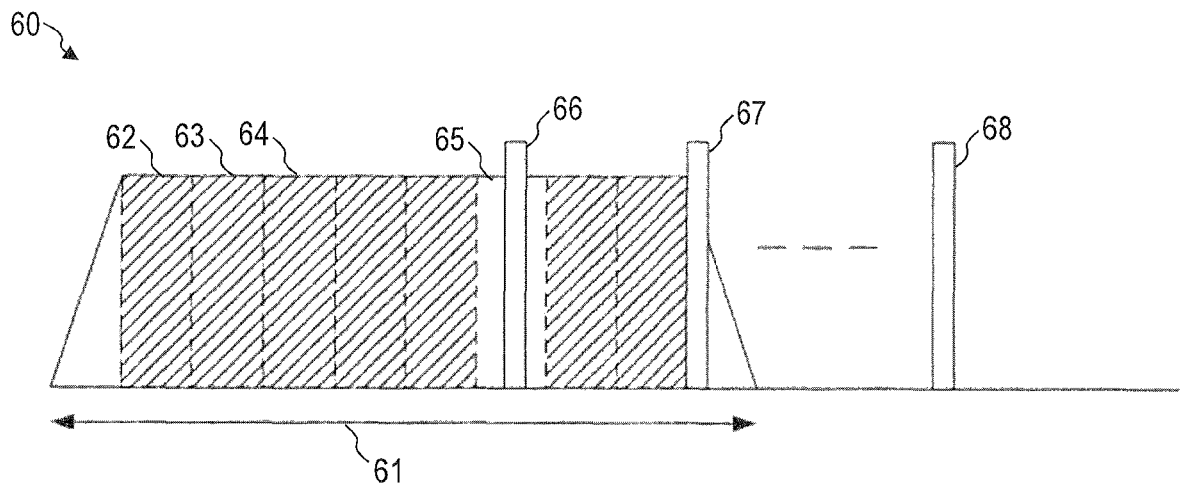
FIG. 5 illustrates frequency usage in the first mode and the second mode.

FIG. 5 illustrates an exemplary resources that may be used by the first radio access network and the second radio access network. An LTE bandwidth 61 is also shown.

The first radio access network may be an eMTC RAN 51. Plural MTC bands 62-65 may be defined within the LTE bandwidth 61. The MTC bands may be deployed with a bandwidth of 1.4 MHz, for example.

Three different configurations of the narrowband resources 66, 67, 68 of the NB-IoT RAN are also shown. The NB-IoT RAN may be operated in an in-band configuration in which the frequency band 66 of the NB-IoT is included within one eMTC band 65. In this case, band 65 should not be allocated for eMTC. The NB-IoT RAN may be operated in a guardband configuration in which the frequency band 67 of the NB-IoT is included within an LTE guardband. The NB-IoT RAN may be operated in a stand-alone configuration in which the frequency band 68 of the NB-IoT does not overlap with the LTE bandwidth.

The various deployment schemes may be deployed in the same base station 20. Therefore, the first cellular network and the second cellular network can maintain a synchronised operation. The first radio access network and the second cellular radio access network may be time in frequencies synchronised. The base station 20 may maintain the same subframe duration and the same start and end of subframes of the first and second radio access networks. The base station 20 may transmit system information in the first radio access network and system information in the second radio access network in a synchronised manner. Thereby, the amount of signalling and processing that needs to be performed by the user equipment 10 in the mode switching is reduced because synchronised first and second cellular radio access networks are maintained. By contrast, in an unsynchronised network, the mode switching would require several synchronisation steps with network assistance.

Signalling complexity and power consumption may be reduced for the second mode because the user equipment 10 may be operative to transmit or receive user data in NAS PDUs when operating in the second mode. This will be exemplarily illustrated with reference to FIG. 6.

Figure 6:
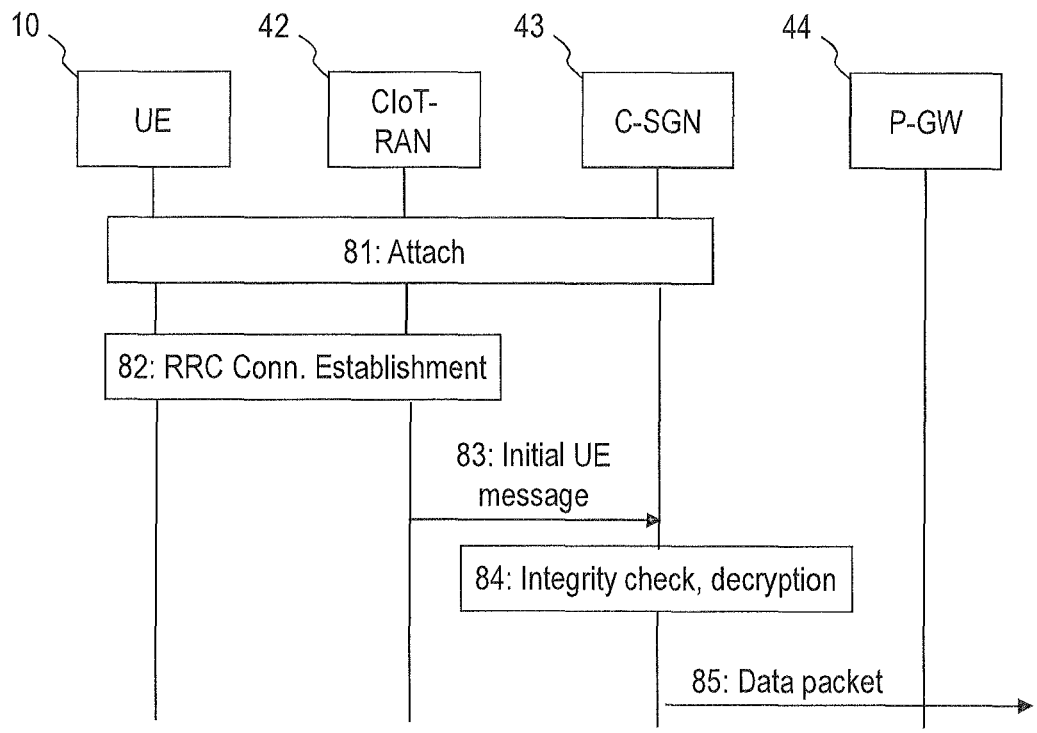
FIG. 6 is a signalling diagram illustrating a user data transmission in a NAS PDU when the user equipment according to an embodiment has dynamically switched to the second mode to reduce power consumption and radio access network loads.

FIG. 6 is a signalling diagram which illustrates a user data transmission when the user equipment operates in the second mode having lower power consumption.

An attach procedure 81 is carried out for the user equipment to attach to the second cellular network. In this step the amount of UL data may be announced e.g. using a buffer status report, BSR. If the amount of data is below the threshold the second cellular network will grant the UE UL resources to complete step 82 and 83. After RRC connection establishment 82, an initial UE message 83 may be transmitted. The message 83 may include encryption data and, optionally, information on whether an acknowledgement is required. Importantly, the message 83 may include a NAS PDU user data transmission as part of the RRC connection establishment in step 82.

At 84, the C-SGN may check integrity protection and may decrypt the data. At 85, the small data packet included in the NAS PDU of the message 83 may be transmitted on.

Such reduced signalling before data transmission, which reduces the number of messages that need to be sent or received by the user equipment before the user data can be transmitted or received compared to eMTC procedures, reduces the complexity and the associated power consumption of the user equipment.

While the user equipment operative to perform the mode switching may have a single radio interface unit that can be used for both signal transmission according to eMTC and signal transmission according to NB-IoT, separate interface units may be provided in the user equipment 10. This is illustrated in FIG. 7.

Figure 7:
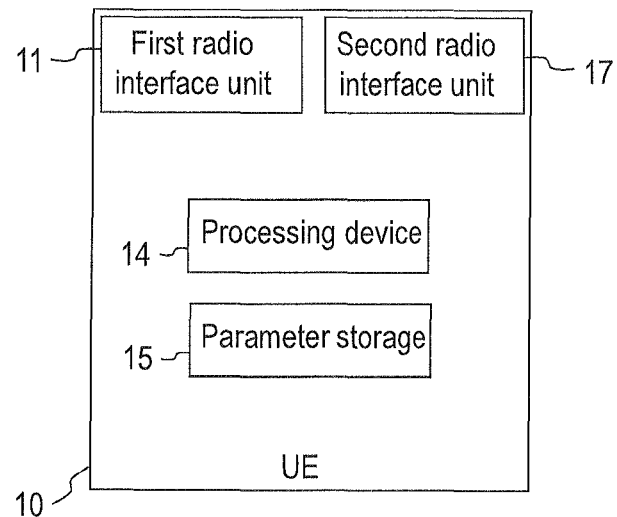
FIG. 7 is a block diagram of a user equipment according to an embodiment.

FIG. 7 shows a block diagram of the user equipment 10 according to another embodiment. The user equipment 10 comprises a first radio interface unit 11 for communication with a first cellular network and a separate, second radio interface unit 17 for communication with a second cellular network. The first and second cellular network may be implemented as described with reference to FIG. 1 to FIG. 6. In order to per form a signal switching, the processing device 14 of the user equipment 10 may selectively deactivate one of the first and second radio interface units 11, 17 and may activate the other one of the first and second radio interface units 11, 17. The conditions under which transitions between the first and second modes will be made and the autonomous and base station controlled procedures may be performed in the same may as described for the user equipment 10 of FIG. 2.

Operation of the user equipment according to embodiments will be described in more detail with reference to FIG. 8 to FIG. 21 below.

Figure 8:
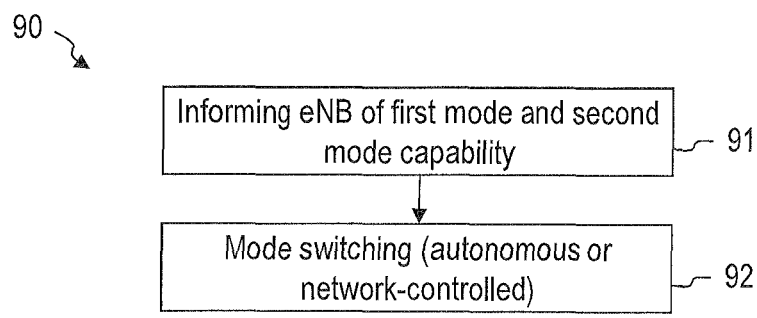
FIG. 8 is a flow chart of a method according to an embodiment.

FIG. 8 is a flowchart of a method 90 according to an embodiment. The method 90 may be performed by the user equipment 10 according to an embodiment.

At 91, the user equipment may inform the base station of its mode switching capability. The user equipment 10 may indicate to the base station 20 that it supports the first mode for communication with the first cellular network and the second mode for communication with the second cellular network and that it can perform autonomous base station controlled mode switching between the first and second modes.

At 92, the user equipment may perform a dynamic mode switching between the first and second modes. The dynamic mode switching may be performed in dependence on buffer filling levels of the user equipment buffer 16, in dependence on data amounts to be transmitted downlink, in dependence on user equipment mobility, or in dependence on other dynamic quantities.

Figure 9:
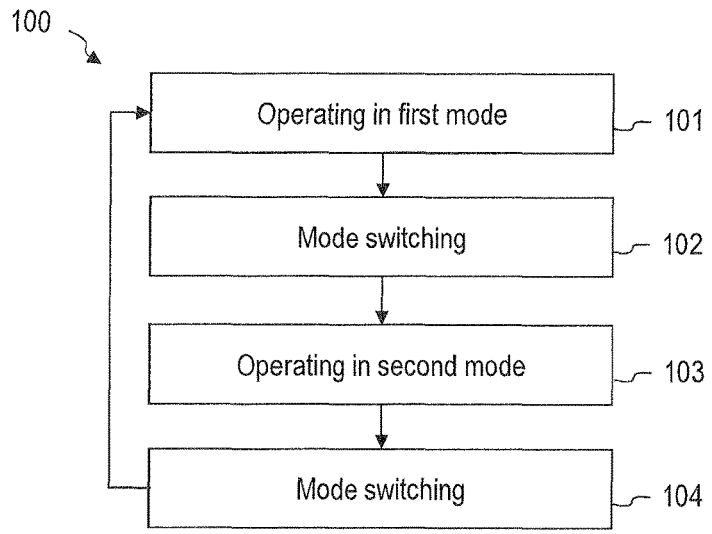
FIG. 9 is a flow chart of a method according to an embodiment.

FIG. 9 is a flowchart of a method 100 according to an embodiment. The method 100 may be performed by the user equipment 10 according to an embodiment. In the method, the user equipment 10 dynamically switches between the first mode and the second mode. The mode switching may be performed in dependence on data amounts to be transmitted uplink or downlink, in dependence on intervals between successive data transmissions, in dependence on user equipment mobility, or in dependence on other parameters such as data context.

At 101, the user equipment 10 operates in the first mode. The user equipment may be attached to the first cellular network, e.g. in attached-idle or attached-active state.

At 102, a mode switching is performed to switch from the first mode to the second mode. The mode switching at 102 may be performed autonomously by the user equipment as a function of a trigger event that may be set by the base station. The mode switching at 102 may be a base station controlled mode switching that is initiated by signalling from the base station.

At 103, the user equipment 10 operates in the second mode. The user equipment may be attached to the second cellular network, e.g. in attached-idle or attached-active state.

At 104, a mode switching is performed to switch from the second mode to the first mode. The mode switching at 104 may be performed autonomously by the user equipment as a function of a trigger event that may be set by the base station. The mode switching at 102 may be a base station controlled mode switching that is initiated by signalling from the base station.

The mode switching between the first mode and the second mode may be repeated thereafter.

Various criteria may be evaluated by the user equipment 10 and/or the base station 20 in order to determine whether a mode switching is to be performed by the user equipment 10.

Figure 10:
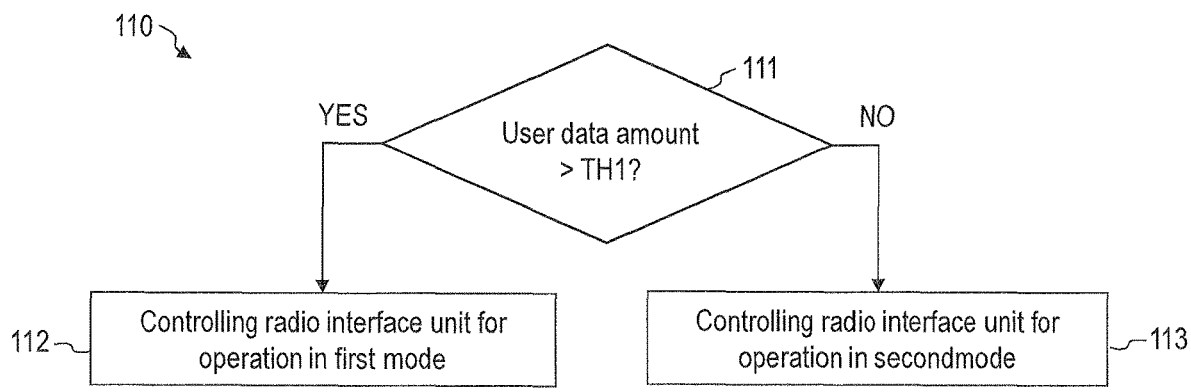
FIG. 10 is a flow chart of a method according to an embodiment.

FIG. 10 illustrates a method 110 according to an embodiment. The method 110 may be performed by the user equipment 10 according to an embodiment.

At 111 it is determined whether the amount of user data that is to be transmitted uplink or downlink exceeds a data amount threshold TH1. The amount of user data may be determined in various ways. For illustration, the user equipment 10 may evaluate its buffer filling level. The user equipment 10 may transmit a BSR to the base station 10 which may then determine whether the data amount exceeds a threshold. Alternatively, for downlink transmission is, the user equipment 10 may receive a paging signal or another signal including an indicator for an amount of data that is to be transmitted downlink. In dependence on the amount of data to be transmitted downlink or uplink, the user equipment 10 may operate in the first mode at step 112 for transmitting or receiving the data to or from the first cellular network or may operate in the second mode at step 113 for transmitting or receiving the data to or from the second cellular network.

In more detail, at 112, the radio interface unit 11 of the user equipment is controlled by the processing device 14 such that the user equipment 10 operates in the first mode for communication with the first cellular network if the amount of data exceeds the data amount threshold. The base station 20 may determine based on the BSR that the first cellular network is to grant UL resources to the user equipment 10 if an uplink data transmission is to be made.

At 113, the radio interface unit 11 of the user equipment 10 is controlled by the processing device 14 such that the user equipment 10 operates in the second mode for communication with the second cellular network if the amount of data does not exceed the data amount threshold. The base station 20 may determine based on the BSR that the second cellular network is to grant UL resources to the user equipment 10 if an uplink data transmission is to be made.

In addition to the amount of data that is to be transmitted, the time between successive data transmissions may also be taken into account. This is illustrated in FIG. 11.

Figure 11:
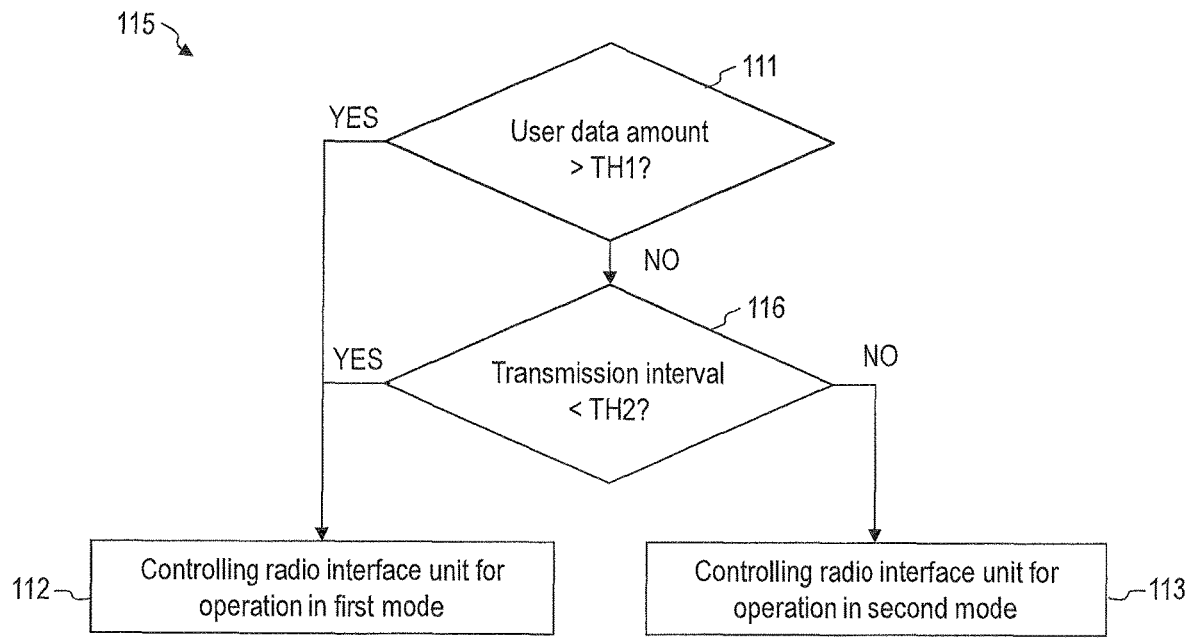
FIG. 11 is a flow chart of a method according to an embodiment.

FIG. 11 is a flowchart of a method 115 according to an embodiment. The method 115 may be performed by the user equipment 10 according to an embodiment.

At step 111, it may be determined whether the amount of user data exceeds the data amount threshold TH1. If this threshold is exceeded, the method may proceed to step 112. If the user equipment presently operates in the second mode, mode switching may be performed in order to allow the large data amount to be transmitted.

At step 116, it may be determined whether the time interval between successive transmissions is less than a time interval threshold TH2. If the data transmissions more frequently than the time interval threshold, the method proceeds to step 112 where the user equipment operates in the first mode to accommodate the more frequent data transmissions.

At step 113, if the amount of user data does not exceed the data amount threshold and if the transmission interval is longer than the transmission interval threshold, the radio interface unit is controlled such that the user equipment operates in the second mode. If the user equipment presently operates in the first mode, a mode switching may be performed to increase battery lifetime and to reduce radio access network loads very transmitting or receiving the data while operating in the second mode.

For user equipments that are sensors or wearable devices, the data amounts may frequently be lower for uplink data transmissions than for downlink data transmissions and/or the transmission rate may be lower for uplink data transmissions than for downlink data transmissions. Accordingly, the mode switching may occur depending on method data is to be transmitted uplink or downlink. This is illustrated in FIG. 12.

Figure 12:
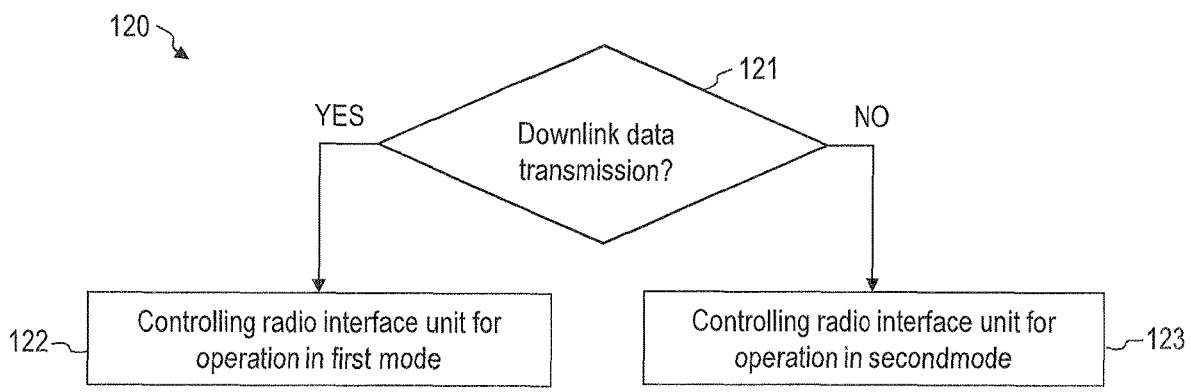
FIG. 12 is a flow chart of a method according to an embodiment.

FIG. 12 is a flowchart of a method 120 according to an embodiment. The method 120 may be performed by the user equipment 10 or the base station 20 according to an embodiment.

At 121, it is determined whether a data transmission is a downlink data transmission.

At 122, if the data transmission is a downlink transmission, the user equipment may be controlled to operate in the first mode.

At 123, if the data transmission is and uplink data transmission, the user equipment may be controlled to operate in the second mode.

The mode switching of a user equipment may be triggered by a signal from the base station. The signal from the base station may cause the user equipment to perform a mode switching. The signal may be a paging signal. In exemplary signalling may be explained in more detail with reference to FIG. 13.

Figure 13:
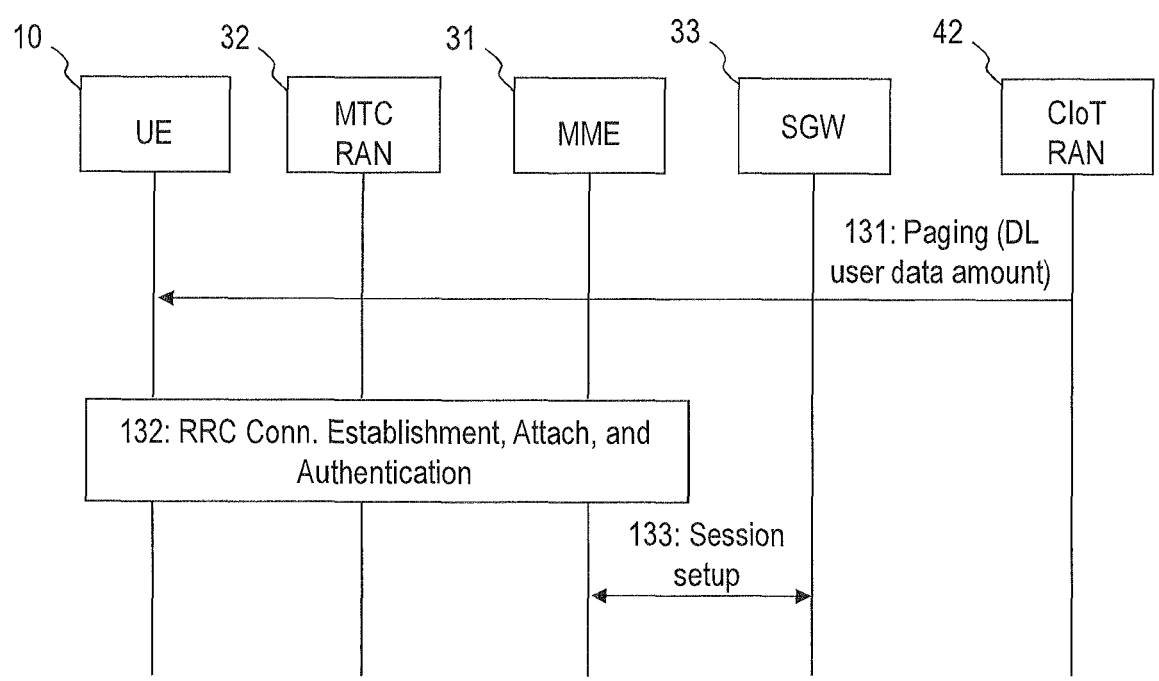
FIG. 13 is a signalling diagram illustrating a dynamic mode switching from a second mode to a first mode in response to a paging signal for a communication system according to an embodiment.

FIG. 13 illustrates a signalling for a system according to an embodiment. A mode switching is performed in dependence on an amount of data that is to be transmitted downlink.

At the beginning of the illustrated signalling flow, the user equipment operates in the second mode. The user equipment may be in attached-idle state in the second cellular network, for example.

A paging signal 131 indicates an amount of downlink user data that is to be transmitted. The indicator for the amount of data may be an implicit or explicit indicator. For illustration, the indicator may indicate whether the base station would prefer the user equipment to operate in the first mode or in the second mode for the downlink data transmission. The indicator may indicate whether the amount of data exceeds a threshold does not exceed the threshold. Other indicators may be used, including explicit information on the amount of data.

Depending on the indicator of the amount of downlink user data that is to be transmitted, the user equipment may determine that a mode switching is to be performed to connect to the first cellular network, e.g. perform random access in the first cellular network. At 132, a connection may be established with the first cellular network. Attach and authentication procedures may be performed in a conventional way. A session setup 133 may be performed. The downlink data transmission may be performed over the first cellular network, also the user equipment originally operated in the second mode when the paging signal 131 was received.

Figure 14:
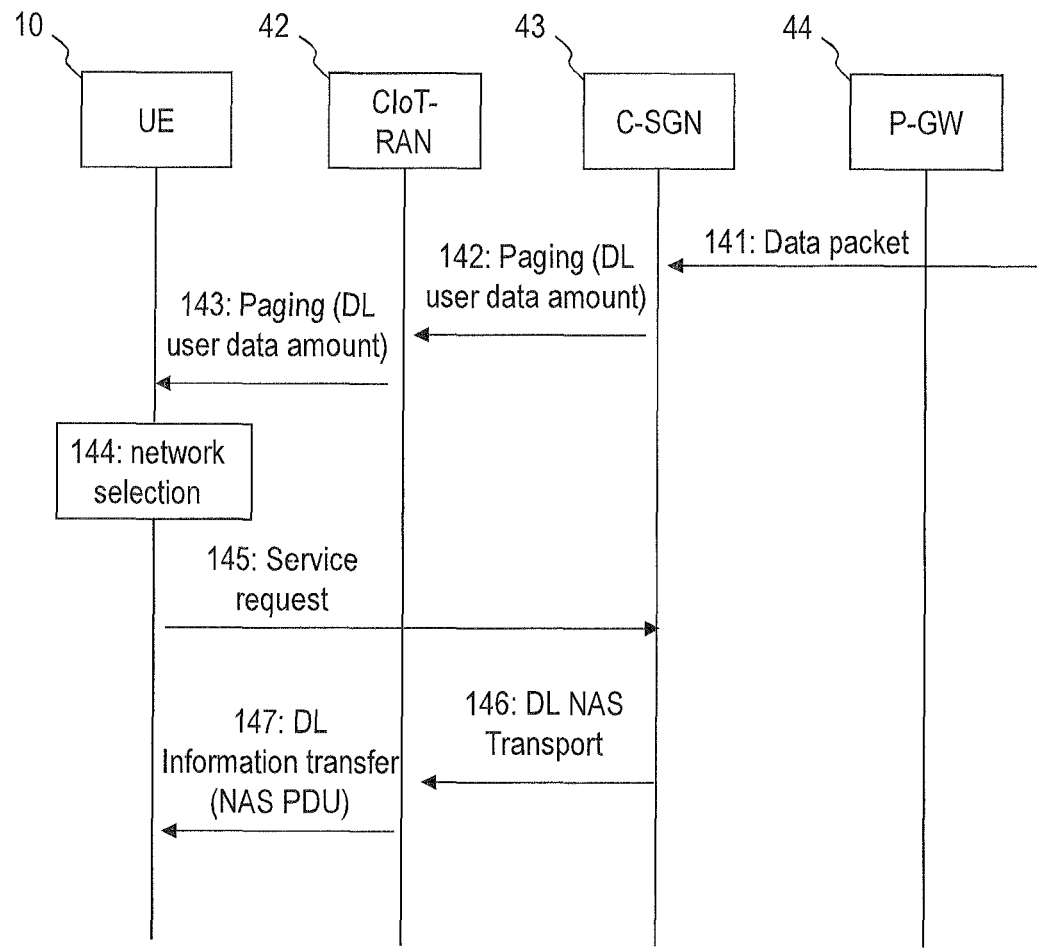
FIG. 14 is a signalling diagram illustrating a paging signal that includes information on a downlink user data transmission for a communication system according to an embodiment.

FIG. 14 illustrates a signalling flow when the data packet is sufficiently small to be received by the user equipment over the second cellular network.

A data packet 141 may be received by a C-SGN 43. The paging signal 142 to the NB-IoT 42 and the paging signal 143 to the user equipment 10 may respectively include an indicator for the amount of user data that is to be transmitted downlink. The indicator for the amount of data may be an implicit or explicit indicator. The indicator may indicate whether the amount of data exceeds a threshold does not exceed the threshold. Other indicators may be used, including explicit information on the amount of data.

At 144, the user equipment 10 determines whether the data is to be received over the first radio access network or the second radio access network. In the illustrated signalling, the user equipment 10 determines that the data packet is sufficiently small to be received over the second radio access network which requires reduced signalling complexity.

At 145, an optimized random access is performed and a service request is transmitted by the user equipment 10 to the C-SGN 43.

At 146, 147, the data is transmitted as NAS PDU to the user equipment 10.

Alternative or additional criteria than data amounts of data to be transmitted or received and intervals between data transmissions may be evaluated in order to determine whether the user equipment shall perform a mode switching between the first mode and the second mode, respectively. One exemplary criterion may be user equipment mobility. For illustration, if the user equipment moves between cells at a rate which exceeds the rate threshold, this may be prohibitive for using the second mode, as will be explained in more detail with reference to FIG. 15.

Figure 15:
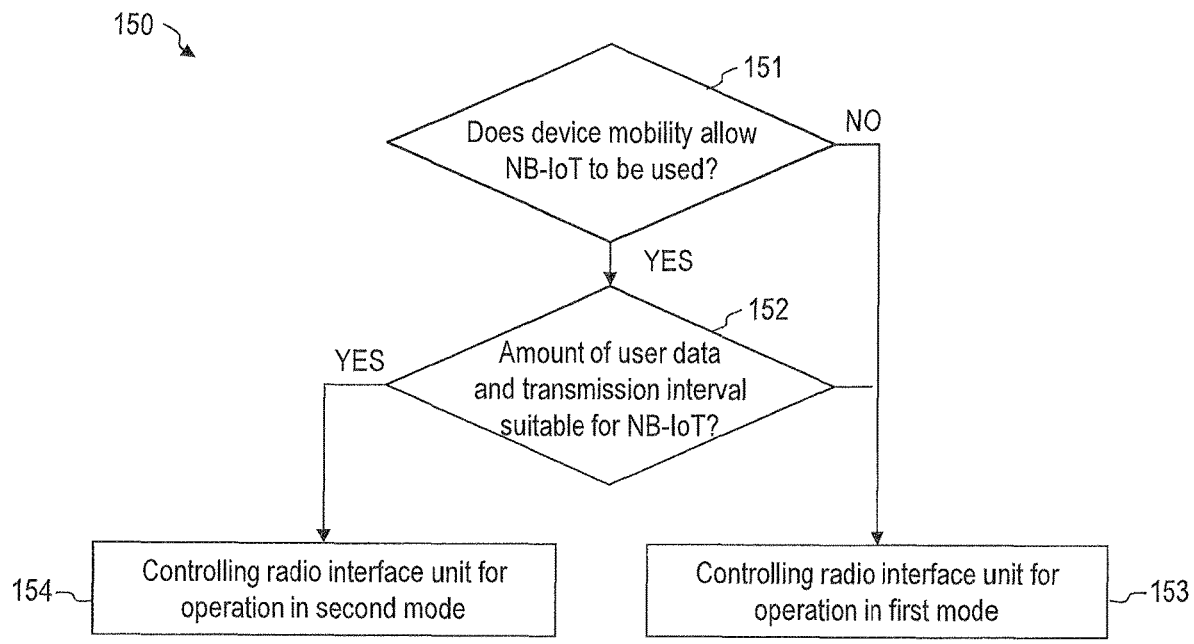
FIG. 15 is a flowchart of a method according to an embodiment.

FIG. 15 is a flowchart of a method 150 according to an embodiment. The method 150 may be performed by the user equipment 10 or the base station 20 according to an embodiment.

At 151, it is determined whether device mobility of the user equipment allows the user equipment to use NB-IoT. To this end, it may be determined whether the user equipment changes radio cells of the second cellular network. It may be determined whether the user equipment moves between radio cells of the second cellular network with a rate which exceeds a rate threshold.

The mobility data of the user equipment 10 may be collected by the user equipment 10 or by the base station 20.

If the user equipment moves too frequently between radio cells of the second cellular network, the method proceeds to step 153. At step 153, the user equipment is controlled such that it operates in the first mode for communication with the first cellular network.

At step 152, it is determined whether the amount of user data and the transmission interval between successive transmissions allows the data to be transmitted over NB-IoT. If the amount of user data is too large or if the transmission interval is too short, the method proceeds to step 153 and the user equipment 10 is controlled such that it operates in the first mode for communication with the first cellular network.

At step 154, if the user equipment does not move too frequently between radio cells of the second cellular network and if, additionally, the amount and frequency of data transmissions is suitable for NB-IoT, the user equipment is controlled to operate in the second mode. Battery lifetime may be prolonged thereby, and radio access network loads may be reduced.

Figure 16:
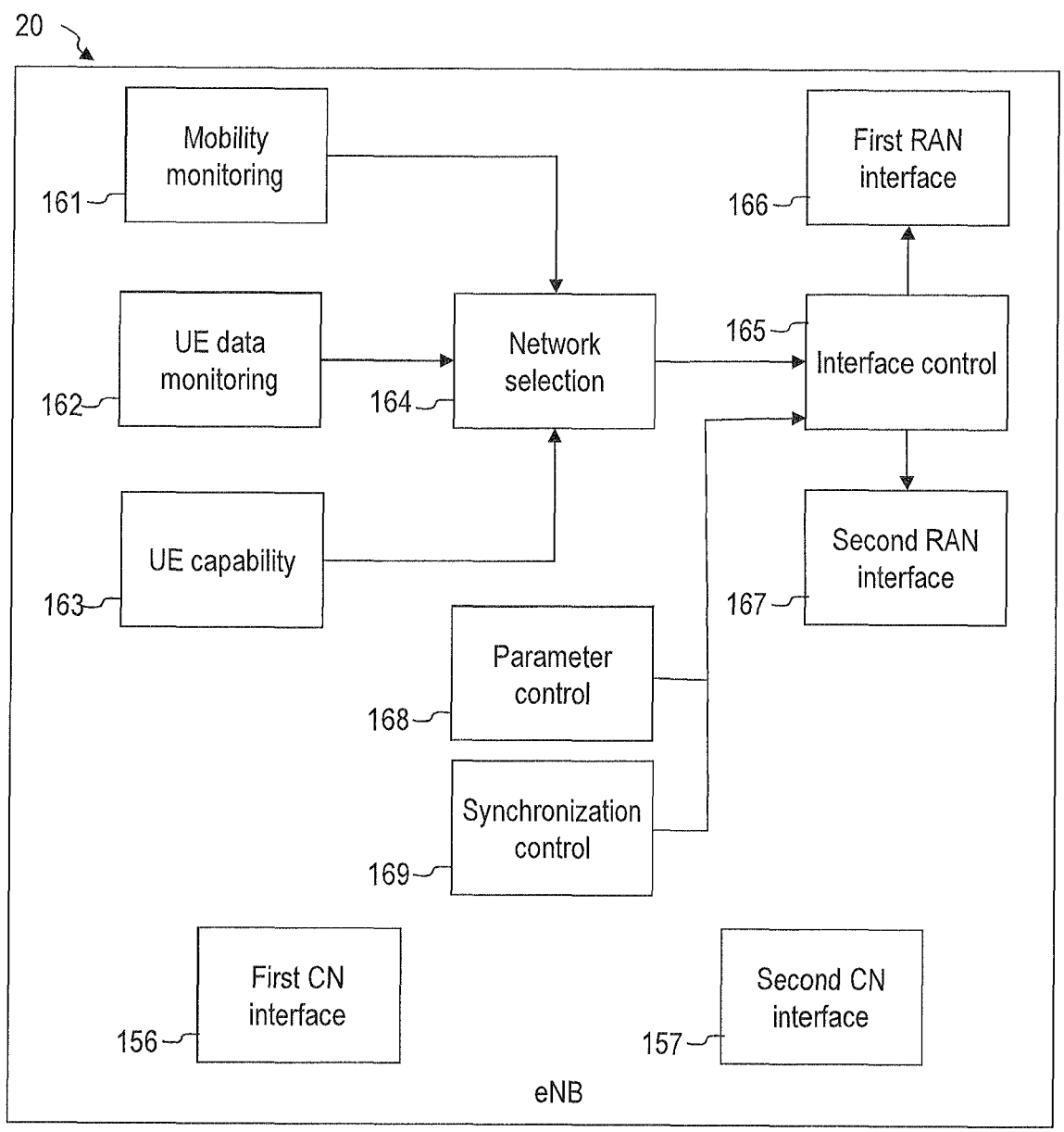
FIG. 16 is a block diagram of a base station according to an embodiment.

FIG. 16 is a functional block diagram of a base station 20 according to an embodiment. The base station 20 may be an eNodeB.

The base station 20 may have a first core network interface 156 for coupling to the first core network 30. The base station 20 may have a second core network interface 157 for coupling to the second core network 40.

The base station 20 may be configured to act both as a base station for the first radio access network and as a base station for the second radio access network. Synchronisation may be facilitated thereby at low signalling loads. If the base station includes separate entities for providing first radio access network functionalities and second radio access network functionalities, the base station 20 may include an internal interface for synchronization between the first RAN and the second RAN.

The base station 20 may have a first radio access network interface unit 166 and a second radio access network interface unit 167. The first radio access network interface 166 may be configured for eMTC signal transmission and reception in accordance with. The second radio access network interface 167 may be configured for NB-IoT signal transmission and reception.

The base station 20 may comprise an interface control unit 165 which controls the first and second radio access network interfaces 166, 167 in dependence on whether the first radio access network or the second radio access is used for communication with the user equipment 10.

A network selection decision unit 164 may be operative to determine whether the user equipment 10 is to operate in the first mode or in the second mode and the third mode switching operations are required. The network selection decision unit 164 may make their decision on whether the user equipment 10 is to perform the mode switching based on various inputs.

The base station 20 may comprise a mobility monitoring unit 161 which monitors user equipment mobility. As long as the user equipment 10 moves too frequently between radio cells of the second radio access network, the base station may force the user equipment 10 to operate in the first mode only.

The base station 20 may comprise a user data monitoring unit 162 operative to determine which amounts of data are to be transmitted downlink and uplink and in which time intervals the data are to be transmitted. The base station 20 may trigger the user equipment 10 to perform the mode switching to the second mode data transmissions to or from the user equipment 10 are infrequent and respectively have small amounts of data.

The base station 20 may comprise a user equipment capability storage unit 163 in which the capabilities of the various user equipments are stored. Only user equipments which can accommodate both the first mode and the second mode and a mode switching therebetween will be triggered to selectively use one of the first mode and the second mode and to perform the mode switching therebetween in dependence on data amounts, mobility, coverage radius, or other parameters.

The base station 20 may comprise a parameter control unit 168. The parameter control unit 168 may be configured to monitor whether parameters, such as frequencies or other resources in the time-frequency resource grid for a mode, have changed since a user equipment as last operated in the respective mode. The parameter control unit 168 may cause transmission of system information including a system information indicator which indicates that the respective parameters have been changed. The system information indicator may be included in a broadcast message or may be transmitted as dedicated message to the respective user equipment 10.

Based on the system information indicator indicating whether a reusing of previously used parameters is possible when the user equipment switches back to a previously used mode, the user equipment 10 may reuse parameters stored in the parameter storage medium 15.

The base station 20 may comprise the synchronisation control 169. The synchronisation control 169 may ensure synchronisation between the first and second radio access networks. For illustration, time and frequency synchronisation may be performed. The subframe durations and start and end times of subframes may be equal for the first and second radio access networks. Further, a predefined pattern of first resources used in the first radio access network and second resources used in the second radio access network (such as a location of the NB-IoT narrowband relative to MTC resources) may be maintained by the base station 20. The synchronisation control 169 may also ensure synchronised transmission of system information in the first radio access network and the second radio access network.

Figure 17:
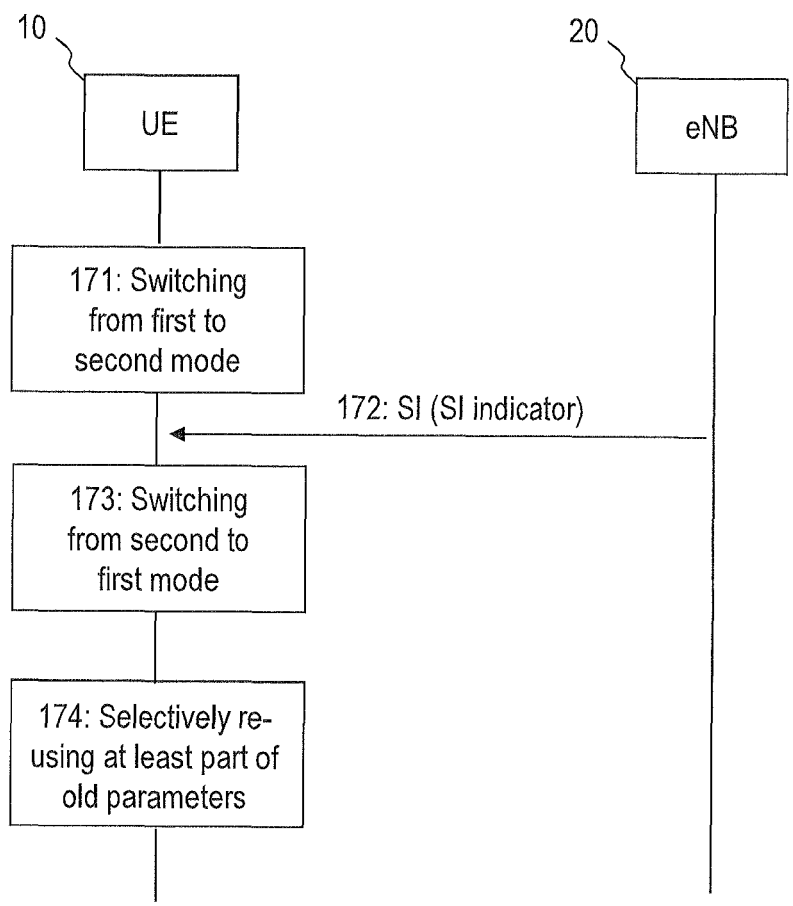
FIG. 17 is a signalling diagram illustrating the use of system information for determining whether previously used parameters may be reused after a mode switching by a user equipment according to an embodiment.

FIG. 17 illustrates operation of the user equipment 10 in response to a system information indicator that indicates with not previously used parameters of one of the modes may be reused.

The user equipment 10 performs a mode switching from the first mode to the second mode at 171. System information 172 includes a system information indicator. The system information 172 may be broadcast or may be transmitted to the user equipment 10 as dedicated message. The system information 172 may indicate in the system information indicator whether parameters of the first mode have changed while the user equipment 10 operates in the second mode. The system information indicator may be a flag in the system information 172.

At 173, the user equipment 10 performs a further mode switching. The user equipment 10 switches back from the second mode to the first mode.

At 174, the user equipment 10 reuses the previously used parameter for the first mode if the system information indicator indicates that the parameters may be reused. The respective parameters may be retrieved from the parameter storage medium 15. Otherwise, if the system information indicator indicates that the parameters must not be reused, the user equipment 10 may discard the parameters stored in the parameter storage medium 15 and may retrieve new parameters from the base station.

Alternatively or additionally to retrieving information on a possible reuse of previously used parameters from a system information indicator, the user equipment 10 may perform other operations in order to establish whether the stored parameters may be reused. For illustration, the user equipment may compare a subset of basic parameters, such as parameters of prioritised operating carrier frequencies, to new system information. If there is a match, the previously used parameters may be reused. Otherwise, the previously used parameters are discarded and the full set of required parameters is retrieved from the base station 20.

Figure 18:
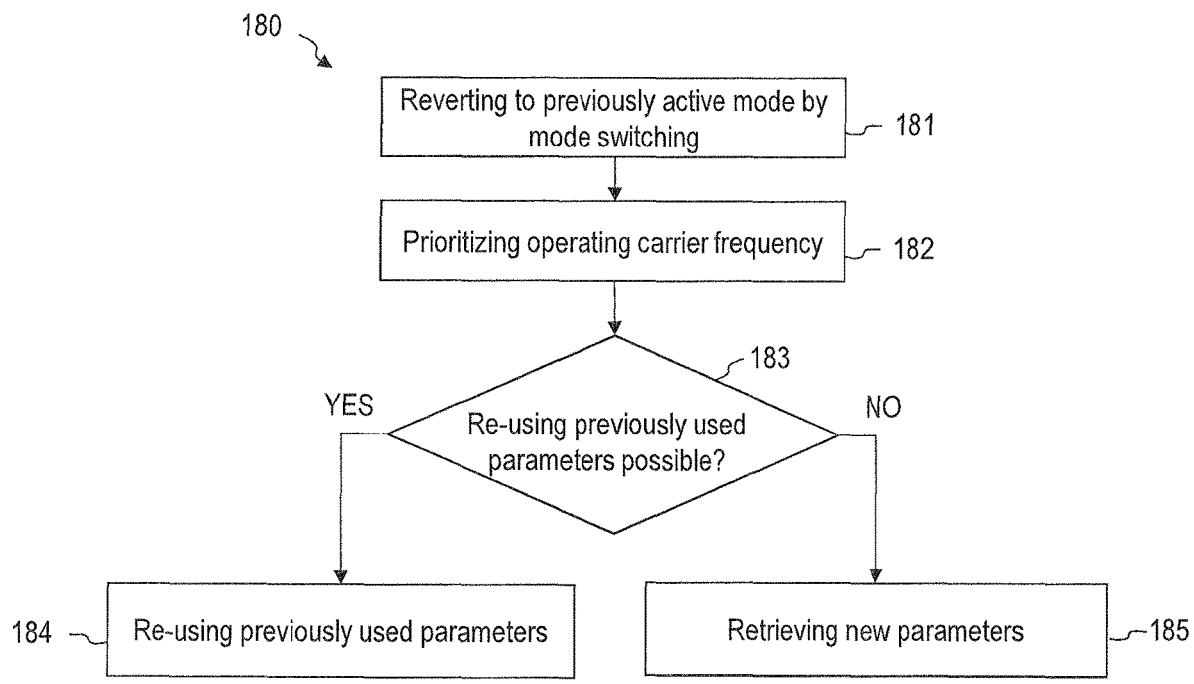
FIG. 18 is a flow chart of a method according to an embodiment.

FIG. 18 is a flow chart of a method 180 according to an embodiment. The method 180 may be performed by the user equipment 10 to determine whether previously used parameters for one of the modes may be reused when the user equipment reverts to the mode.

At 181, the user equipment may revert to a previously active mode by a further mode switching. For illustration, a user equipment presently operating in the second mode may revert to the first mode in which it operated prior to a preceding mode switching.

At 182, the user equipment may identify the most relevant parameters. To this end, carrier frequencies may be prioritised. Other techniques may be used to identify a subset of parameters that is most critical to the operation in the first mode.

At 183, it is determined method the previously used parameters of the first mode may be reused. To this end, the basic parameters of the most important carrier frequencies may be compared to the currently used parameters of the first radio access network. If it is determined that the previously used parameters for the mode to which the user equipment 10 reverted can be reused, the method proceeds to 184. At 184, the previously used parameters are retrieved from the parameter storage medium 15 and are used again. If it is determined that the previously used parameters for the mode to which the user equipment 10 reverted cannot be reused, the method proceeds to 185. At 185, the previously used parameters are discarded and new parameters for the mode to which the user equipment switched are retrieved.

Core network nodes of the first core network 30 and the second core network 40 may facilitate a mode switching which requires little signalling. To this end, core network nodes of the first core network 30 and of the second core network 40 may share user equipment context information, for example, once the user equipment has registered with one of the core networks.

Figure 19:
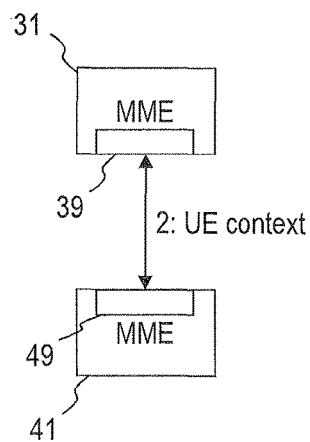
FIG. 19 illustrates a transfer of user equipment context information between a first core network node and a second core network node.

FIG. 19 is a diagram illustrating a first core network node 31 of the first core network 30 and a second core network node 41 of the second core network 40. The first core network node 31 may be an MME of a LTE CN. The second core network node 41 may be an MME of the CIoT CN or a node (e.g. C-SGN) performing MME function for a CIoT CN. The first core network node 31 and the second core network node 41 may have interfaces 39, 49 for exchanging user equipment context information 2. The exchange of user equipment context information may be started once registration of the user equipment in one of the first and second cellular networks is completed. This allows the user equipment 10 to perform the mode switching without having to register independently in both MMEs.

Figure 20:
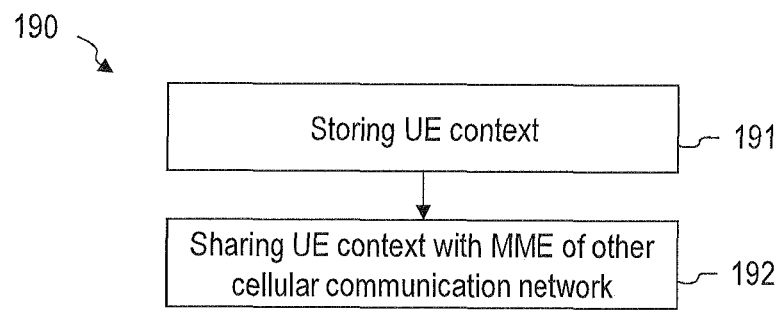
FIG. 20 is a flowchart of a method according to an embodiment.

FIG. 20 is a diagram illustrating a method 190 performed by a core network node according to an embodiment.

At 191, the core network node may store user equipment context information.

At 192, the core network node may share the user equipment context information with a core network node of another cellular network. For illustration, an MME in a legacy LTE CN and an MME in a CIoT CN may share the UE context information. This may happen in such a way that the MME of the CN in which the UE is registered transfers the UE context information to the MME in the other CN.

While various techniques have been described which allow the user equipment 10 to dynamically switch between the first and second mode is in depending on mobility, data amounts, data transmission intervals, data context, other parameters may also be taken into account in determining with the user equipment 10 is to perform a mode switching. For illustration, the second radio access network may be associated with cells having a larger coverage area or coverage radius. The user equipment 10 may be caused to switch to the second mode if an enlarged coverage is desired, for example when the base station 20 detects that the signal strength or a signal quality indicator falls below a quality threshold while the user equipment operates in the first mode.

Figure 21:
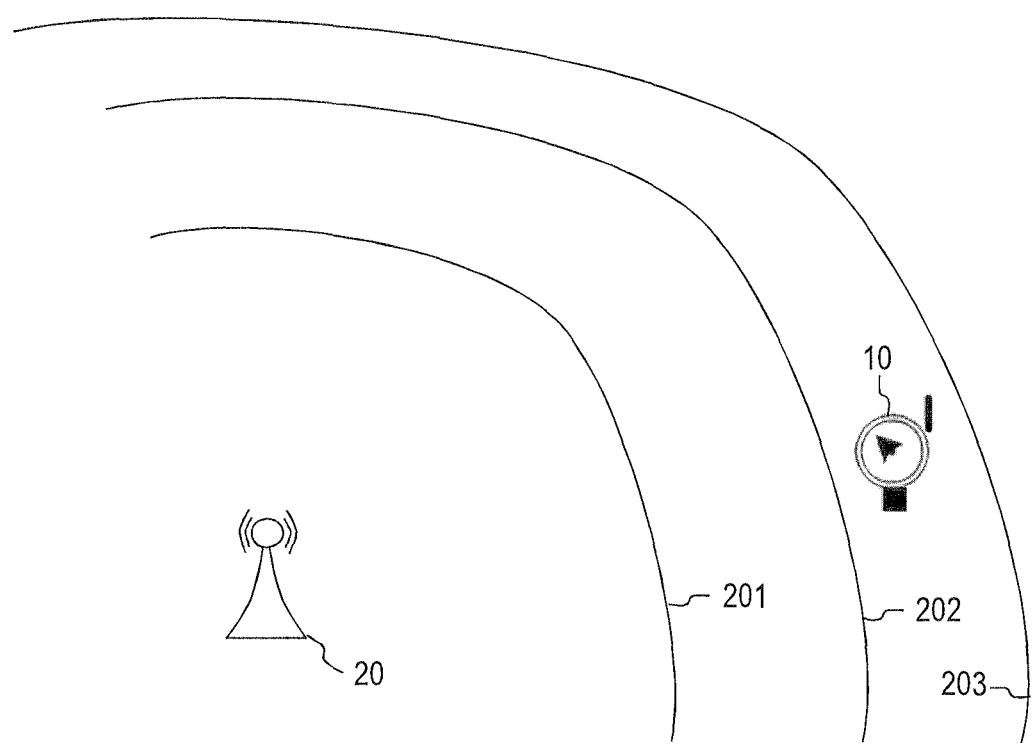
FIG. 21 is a diagram illustrating a mode switching perform by the user equipment according to an embodiment for extended coverage.

FIG. 21 illustrates the performance of mode transitions to accommodate increased coverage radius. The normal coverage in legacy LTE is defined by a first coverage radius 201. The eMTC has a second, extended coverage 202. NB-IoT provides a third, even further extended coverage 203. A user equipment 10, which may be a sensor or a wearable device, may be caused to perform a mode switching from the first mode to the second mode when the user equipment 10 leaves the eMTC coverage 202.

Various effects are attained by the devices, methods and systems according to embodiments. For illustration, user equipment battery lifetime may be prolonged. Radio access network loads may be reduced. This is attained by selectively switching to the second mode in which complexity of radio access network procedures and accordingly power consumption of the user equipment are reduced. The base station can dynamically manage resource usage by user equipments that are capable of operating in the first mode and the second mode.

While exemplary embodiments have been described with reference to the drawings, modifications may be implemented in other embodiments. For illustration, while embodiments have been described in the context of exemplary first and second cellular networks in first and second radio access networks, the techniques discussed herein are applicable to a wide variety of other cellular networks. For further illustration, while exemplary criteria for mode switching have been described, other parameters may be considered alternatively or additionally in order to determine whether mode switching is to be performed. Mode switching may be implemented autonomously at the user equipment may be performed under the control of the base station.

While the user equipment may be a sensor or a wearable device, the techniques discussed herein may also be used in conjunction with other user equipments.

Although the invention has been shown and described with respect to certain preferred embodiments, equivalents and modifications will occur to others skilled in the art upon the reading and understanding of the specification. The present invention includes all such equivalents and modifications, and is limited only by the scope of the following claims.

The invention claimed is:

1. A user equipment, comprising:
a radio interface; and
a processing device coupled to the radio interface to control the radio interface, the processing device being operative to control a mode switching between a first mode in which the user equipment is configured for communication with a first cellular network and a second mode in which the user equipment is configured for communication with a second cellular network, wherein the processing device is operative to effect the mode switching between the first mode and the second mode in response to a trigger event,
the user equipment having a first power consumption when operating in the first mode and a second power consumption when operating in the second mode, the second power consumption being different from the first power consumption, and
wherein the trigger event relates to at least one of a data payload size, a transmission interval, a buffer status, payload data context, or a required coverage.

2. The user equipment of claim 1,
wherein the user equipment is configured for communication with a Cellular Internet of Things, CIoT, network when operating in the second mode.

3. The user equipment of claim 2,
wherein the first cellular network has a first core network and the second cellular network has a second core network different from the first core network.

4. The user equipment of claim 1, wherein
the user equipment when operating in the first mode has to exchange a first number of messages with the first cellular network before user data can be sent to the first cellular network or can be received from the first cellular network, and
the user equipment when operating in the second mode has to exchange a second number of messages with the second cellular network before user data can be sent to the second cellular network or can be received from the second cellular network, the second number of messages being less than the first number of messages.

5. The user equipment of claim 1,
wherein the user equipment is operative to transmit and/or receive user data in a control plane signalling message when operating in the second mode.

6. The user equipment of claim 1,
wherein the user equipment is operative to perform the mode switching in dependence on
an amount of user data that is to be transmitted or received, and/or
a time interval between successive user data transmissions.

7. The user equipment of claim 6,
wherein the user equipment is operative to switch to the second mode if the amount of user data is less than a data amount threshold and if the time interval exceeds a time interval threshold.

8. The user equipment of claim 6,
wherein the user equipment is operative to transmit a buffer status report, BSR, to indicate an amount of user data that is to be transmitted.

9. The user equipment of claim 1,
wherein the processing device is operative to control the user equipment to effect the mode switching from the second mode to the first mode in response to a paging signal from the second cellular network.

10. The user equipment of claim 9,
wherein the processing device is operative to control the user equipment to attach to the first cellular network in response to the paging signal received from the second cellular network.

11. The user equipment of claim 9,
wherein the paging signal includes an indicator for an amount of user data that is to be transmitted in a downlink transmission.

12. The user equipment of claim 1,
wherein the processing device is operative to cause storage of operating parameters of a mode in which the user equipment operated prior to a first mode switching and to reuse the operating parameters when the user equipment returns to the mode in a subsequent second mode switching.

13. The user equipment of claim 12,
wherein the processing device is operative to process system information transmitted or broadcast by a base station to determine whether the operating parameters are to be reused.

14. The user equipment of claim 1,
wherein the user equipment is configured such that the mode switching is performed as a function of a mobility of the user equipment.

15. A communication system, comprising:
a base station coupled to a first core network and to a second core network; and
the user equipment of claim 1.

16. The communication system of claim 15,
wherein the first core network comprises a first core network node and the second core network comprises a second core network node interfaced with the first core network node,
wherein
the first core network node is operative to transfer to the second core network node user equipment context information stored in the first core network node, and
the second core network node is operative to transfer to the first core network node user equipment context information stored in the second core network node.

17. The communication system of claim 15,
wherein the second core network is a Cellular Internet of Things, CIoT, core network.

18. A method of controlling operation of a user equipment, wherein the user equipment comprises a radio interface and is operative to attach to a first cellular network and to attach to a second cellular network (40) different from the first cellular network, wherein the method comprises:
controlling the user equipment such that it operates in a first mode in which the user equipment is operative to attach to the first cellular network, the user equipment having a first power consumption when operating in the first mode;
controlling a mode switching between the first mode and a second mode in which the user equipment is operative to attach to the second cellular network, wherein the mode switching is in response to a trigger event; and
controlling the user equipment such that it operates in a second mode in which the user equipment is operative to attach to the second cellular network, the user equipment having a second power consumption when operating in the second mode, the second power consumption being different from the first power consumption,
wherein the trigger event relates to at least one of a data payload size, a transmission interval, a buffer status, payload data context, or a required coverage.

19. The method of claim 18, wherein the user equipment comprises:
a radio interface; and
a processing device coupled to the radio interface to control the radio interface, the processing device being operative to control a mode switching between a first mode in which the user equipment is configured for communication with a first cellular network and a second mode in which the user equipment is configured for communication with a second cellular network,
the user equipment having a first power consumption when operating in the first mode and a second power consumption when operating in the second mode, the second power consumption being different from the first power consumption.

* * * * *